United States Patent Office 3,523,773
Patented Aug. 11, 1970

3,523,773
ABRASIVE ARTICLES CONTAINING A POLYIMIDE RESIN AND LEAD-GLASS BOND
Leo A. Sears, Wilmington, Del., assignor to E. I. du Pont de Nemours and Company, Wilmington, Del., a corporation of Delaware
No Drawing. Filed Jan. 26, 1967, Ser. No. 611,833
Int. Cl. C08g 20/32; C08h 17/04
U.S. Cl. 51—298
10 Claims

ABSTRACT OF THE DISCLOSURE

A grinding wheel formed of an abrasive such as diamonds and a binder of a high temperature synthetic resin such as an aromatic polyimide and other additives wherein a low melting glass is incorporated in the composition and melted during fabrication of the grinding wheel, to produce a glass/diamond bond in addition to the resin/diamond bond.

BACKGROUND OF THE INVENTION

The abrasive wheels of the present invention are especially useful in off-hand grinding applications which generally require a "vitreous" (glass-bonded) abrasive wheel.

In a tool shop, general purpose grinding, often called off-hand grinding, requires a general purpose wheel since a wide variety of materials including tungsten carbide and tool steel are ground. For this purpose, vitreous-bonded diamond abrasive wheels are used. These wheels are a compromise between metal-bonded wheels which cut too slowly for this application and resin-bonded wheels which cut faster but wear too rapidly. The vitreous wheels are generally flat face cup wheels mounted vertically which are cooled with a stream of coolant. Workpieces are usually hand-held with the aid of a tool rest or holder.

However, there are certain disadvantages to vitreous-bonded grinding wheels. Unless cooling is adequate, workpieces may be burned, and because the wheels are hard, chipping of the workpiece being ground may occur. Special tool holders are required for grinding positive tool angles (angles less than 90°) to avoid chipping of the wheel. Moreover, vitreous-bonded wheels tend to load, necessitating a cleaning procedure. In addition, two vitreous-bonded wheels are generally needed to grind a tool, one for roughing (120–150 grit) and one for finishing (220 grit) to tolerances.

A principal problem with resin-bonded abrasive wheels for off-hand grinding is their softness which results in grooving of the wheel and rapid wear. In this regard, resin-bonded wheels exhibit poor performances as compared with vitreous-bonded abrasive wheels.

SUMMARY OF THE INVENTION

It has now been found that by incorporating a water-insoluble glass that has a low softening or melting temperature into a diamond-containing composition which contains a high temperature synthetic resin, which composition optionally may also contain other fillers normally used in grinding wheels such as copper, silicon carbide and like materials, resin-bonded abrasive wheels can be made which are suitable for off-hand grinding. These wheels exhibit grinding characteristics equal to or better than those obtained with vitreous-bonded wheels without the disadvantages of either the vitreous-bonded abrasive wheels or the conventional resin-bonded abrasive wheels. These wheels are characterized by good wear, good cutting ability, lack of loading, and production of good finishes using only one wheel of intermediate grit. No special tool holders are needed to grind positive tool angles and the wheels, although normally cooled with a stream of coolant, may be used dry, a procedure not possible with standard vitreous-bonded wheels.

The unexpected result achieved by adding a low softening or melting glass arises from the deformability of the glass during the fabrication of the resin/diamond bond. The extremely high fabrication temperatures (from about 250–500° C., preferably 375–480° C.) and pressures required for coalescing high temperature polyimide resins are above the softening or melting temperatures of certain glasses at those pressures, particularly those designated as lead glasses. A typical composition for a lead glass is: silica—$SiO_2$, 68%; lead oxide—$PbO$, 15%; soda—$Na_2O$, 10%; potash—$K_2O$, 6%; and lime—$CaO$, 1%. During the fabrication process to coalesce the polyimide binder, the glass particles deform and flow to fill any voids which otherwise would remain between diamond particles and the resin matrix which adheres to them. The bond thus formed is harder and stiffer and resists grooving and wearing of the grinding surface during off-hand grinding applications while retaining the free cutting quality of standard resin-bonded wheels. This improvement is possible only when the fabrication temperature of the resin is greater than the softening or melting temperature of the glass. These glasses are softened and caused to deform, flow and coalesce at the resin fabrication temperatures, thus adhering to themselves and other ingredients in the composition. The glass thus becomes an integral part of the matrix holding the diamond grit rather than remaining as an inert particulate filler.

The present invention is generally applicable to particulate essentially linear heat and pressure fabricatable resins having a second order glass transition temperature greater than 250° C. and a flexural modulus, at 20° C., greater than 300,000 p.s.i. as measured by ASTM D–790. A fabricatable resin includes both moldable and coalesceable resins. Coalescence seems to be neither a molding operation nor a sintering operation but results from a combination of heat and pressure and appears to be a surface phenomenon which occurs at a temperature below the crystalline melting point of the resin. Thus, the resin should also have a surface area of at least 2 meters$^2$/gram and preferably at least 5 meters$^2$/gram. Examples of preferred coalesceable high temperature resins are the coalesceable aromatic polyimide resins, particularly poly-N,N'-(4,4'-oxydiphenylene)pyromellitimide, disclosed in U.S. Pat. No. 3,179,631 to Andrew Laszlo Endrey entitled "Aromatic Polyimide Particles From Polycyclic Diamines" and those prepared by the process in U.S. Pat. No. 3,249,588 to Walter George Gall entitled "Process For Preparing Finely Divided Polyimide Particles Of High Surface Area."

The resins employed in conventional phenolic/abrasive bonds degrade at the elevated temperatures required for low melting glasses to deform or flow extensively. Thus, the advantages of the resinoid-vitreous bond for diamond grinding wheels for off-hand grinding are not observed with phenolic wheels due to the lower fabrication temperatures.

The molding composition comprises abrasives, high temperature resin powder, glass powder and optionally contains particulate metals. The relative volumes of the various constituents of the molding composition are: abrasives, about 6–35%, but preferably 15–35% of the total volume; high temperature resin, no less than 45% of the total volume; glass, 5% to 31% of the non-abrasive volume; and metal, 0% to 20% of the non-abrasive volume. In any event, the high temperature resin should occupy at least 69% of the non-abrasive volume.

Glass is a noncrystalline material which is rigid at room temperature and soft or fluid at high temperatures. There is no definite freezing point as glass passes from fluid to solid but only an increase in viscosity.

The viscosity of glass is an inverse function of temperature, and four points on the viscosity-temperature curve have been chosen arbitrarily as reference points for the softness of glass. These points are strain point, annealing point, softening point, and working point. As an example of how the viscosity of a given glass for a given temperature is determined, a viscosity-temperature curve is plotted with the viscosity in terms of $Log_{10}$ Poises and the temperature in ° C. For a typical glass, the four points are as follows: a viscosity at the strain point of about $10^{14.5}$ poises as measured by the Tentative Method of Test for Annealing Point and Strain Point of Glass (ASTM Designation: C.336); a viscosity at the annealing point of about $10^{13}$ poises as measured by the same test method; a viscosity at the softening point of about $10^{7.6}$ poises as measured by the Tentative Method of Test for Softening Point of Glass (ASTM Designation: C.338); and a viscosity of about $10^4$ poises at the working point. This information is then plotted on the graph and the viscosity in poises at the fabrication temperature of the resin is determined from the graph. Water-insoluble glasses which are suitable for use in this invention are those whose viscosities are less than $10^{11}$ poises, measured as above described, at the molding temperature, which will be in the range of about 250° C. to about 500° C., for the particular resin used. In general, the glasses which meet this specification will be lead glasses but other glasses that meet the specification will also be satisfactory. In general, the glasses which meet the above specifications have coefficients of expansion greater than $5 \times 10^{-6}$ inches/inch/° C. at 0–300° C. The glass should be in the form of a particulate powder preferably finer than about 100 microns to be of a proper size to disperse readily in the abrasive composition.

Suitable particulate abrasives to be used in compounding the abrasive composition and off-hand grinding wheels therefrom are conventional abrasives such as silicon carbide and aluminum oxide and preferably diamonds. The abrasive size is not critical but for most grinding wheel production the abrasive should be capable of passing a mesh screen (U.S. Standard Sieve Series) of 80 mesh, preferably 120–400 for off-handing grinding wheels.

In some applications of the grinding wheel of this invention, it may be desirable to conduct the heat generated at the wheel surface away as quickly as possible. In that event, it is desirable that a particulate metal (fibers of small dimension or finely divided metallic powders) be added to the composition prior to fabrication. Any rapidly conductive metal can be used but for cost and malleability, copper is preferred.

Pressures under which high performance grinding wheels may be produced may range from about 10,000 to 50,000 p.s.i. It is preferred to compact the grinding composition at about 25,000 p.s.i. while increasing the temperature to 450° C. but the composition may optionally be heated before applying pressure.

EXPERIMENTAL DATA

Wheel preparation

The components used to prepare the wheels of Examples 1–9 included high molecular weight coalesceable poly-N,N' - (4,4' - oxydiphenylene)pyromellitimide resin passing a 200-mesh screen (U.S. Standard Sieve Series), synthetic diamond of 180 and/or 220 grit or mesh and of 100 concentration, 1-mil copper fibers of average length to diameter ratio of 20 to 1 or copper powder, preferably treated with hydrogen to remove oxides, and glass powders, as shown in Table I, passing 325-mesh screens.

TABLE I

| No. | Type | Annealing Point (° C.) | Softening Point (° C.) | Density (g./cc.) |
|---|---|---|---|---|
| 1 | High Lead | 315 | 380 | 6.27 |
| 2 | do | 365 | 440 | 5.42 |
| 3 | Borosilicate | 540 | 780 | 2.22 |

The compositions used in making the wheels were obtained by admixing the dry ingredients which were then compacted at about 4,000 p.s.i. at room temperature in a mold having a ring shaped cavity of inner diameter of 5 inches and outer diameter of 6 inches. The mold and its contents were heated in a vacuum oven at about 300° C. for about 8 to 18 hours with a small bleed of nitrogen gas. At the end of the heating cycle, the mold and contents were transferred to a press with heated platens, and heaters were attached to the mold. The temperature was raised to about 450° C. and a pressure of 25,000–50,000 p.s.i. was applied for about 30 minutes. In Example 9, a pressure of 25,000 p.s.i. was applied before the temperature was raised to 450° C. The mold was cooled with a stream of air and when the temperature dropped to 300° C., the pressure was released. The molding was then removed from the mold and cooled slowly.

The resulting ring shaped rim was glued to an aluminum core of basic shape D6 (American Standards Assoc.) using C–7 epoxy adhesive made by the Armstrong Products Co. which was filled with 30% by weight atomized aluminum powder made by Reynolds Metals Co. The resulting grinding wheel was a D6A2 (American Standards Assoc.) flat face cup wheel of 6-inch diameter and ½-inch rim width. Rim thickness was 1/16-inch (Examples 1–4 and 6–8) and 1/8-inch (Examples 5 and 9).

The wheels of Examples 5, 7, 8 and 9 were molded with an interlayer between the abrasive containing rim and the aluminum core. This was achieved by using a second composition comprising a mixture of polyimide, glass and 240 grit silicon carbide (in place of diamond) of the same volumetric composition as the diamond-containing composition. The two compositions were compacted on top of each other in the mold with only hand pressure used for initially compacting the first layer. The wheel manufacture was then carried out as described above. In one wheel, Example 2, aluminum powder was used in place of the silicon carbide in the interlayer. In two wheels, Examples 7 and 9, equal proportions of 180 and 220 grit diamonds were used.

Use test procedure

The wheels were tested on a Gallmeyer and Livingstone No. 28 grinder with the axis of rotation horizontal to the table. Spindle speed was 3365 r.p.m., and coolant (2.7% aqueous International 218X) was delivered to the wheel face and above the workpiece. Workpieces were blocks of tungsten carbide ½-inch x ¾-inch, C–5 (hardness of 90.2–91.2 on the Rockwell A scale) grade, for roughing, and ½-inch x ½-inch, C–3 (hardness 92.6 on the Rockwell A scale) grade, for radius grinding. In this off-hand type grinding test, the table traverse speed and infeed were controlled by hand. The roughing operation was performed by grinding the test face using a table traverse speed as rapid as possible for 27 passes total with infeed of 0.003 inch per pass. The second test piece was then fitted to a holder which moved on a swivel arrangement over about 45° of arc. The surface of the test piece to be ground could then be rotated back and forth in contact with the grinding wheel to produce a surface with the curve of a circle of 2–3 inches in radius. Between each contact with the wheel, the piece was advanced 0.003 inch for a total of 17 steps followed by advances of 0.004 inch for 7 steps. The test piece was then turned 90° and the same face was subjected to the same sequence of grinding steps. The total quantity of tungsten carbide removed during the test was 0.07 cubic inch. The time for the test generally varied from 8 to 15 minutes, depending upon the quality of the wheel.

Results

Table II shows summarized data relating to Examples 1–9.

TABLE II

| Example No. | Diamond Grit | Volume percent[1] Resin | Type Glass | Volume percent[1] Glass | Type Copper | Volume Percent[1] Copper | Rim wear (in.) |
|---|---|---|---|---|---|---|---|
| 1 | 180 | 70 | 1 | 15 | Fibers | 15 | 0.00095 |
| 2 | 180 | 70 | 1 | 15 | do | 15 | 0.00075 |
| 3 | 180 | 70 | 2 | 15 | do | 15 | 0.0023 |
| 4 | 180 | 70 | 3 | 15 | do | 15 | (2) |
| 5 | 180 | 70 | 1 | 30 |  | 0 | 0.00245 |
| 6 | 180 | 85 | 1 | 15 |  | 0 | 0.0033 |
| 7 | 180 and 220 | 77 | 1 | 18 | Powder | 5 | 0.0014 |
| 8 | 180 | 77 | 1 | 18 | Fibers | 5 | 0.0018 |
| 9 | 180 and 220 | 77 | 1 | 18 | Reduced Powder | 5 | 0.0011 |

[1] Of the non-abrasive volume.
[2] Unmeasurable due to grooved, uneven wear.

As many apparently widely different embodiments of this invention may be made without departing from the spirit or scope thereof, it is to be understood that this invention is not limited to the specific embodiments thereof except as defined in the appended claims.

I claim:

1. An abrasive article consisting essentially of an abrasive which comprises about 6% to about 35% of the total volume, an essentially linear heat and pressure fabricatable high temperature resin having a second order glass transition temperature greater than about 250° C. and a flexural modulus greater than about 300,000 p.s.i. as measured by A.S.T.M. D–790 which comprises at least 69% of the non-abrasive volume, a water-insoluble lead glass having a viscosity less than about $10^{11}$ poises at resin fabrication temperatures of about 250° to 500° C. which comprises about 5% to about 31% of the nonabrasive volume and a particulate metal which comprises 0% to about 20% of the nonabrasive volume.

2. The abrasive article of claim 1 in which the abrasive is diamond and the high temperature resin is an aromatic polyimide resin.

3. The abrasive article of claim 2 in which the aromatic polyimide resin is poly - N,N' - (4,4' - oxydiphenylene) pyromellitimide.

4. A grinding wheel having a grinding surface composed of the abrasive article of claim 1.

5. In a process for forming a resin bonded grinding wheel by mixing together particulate abrasive and particulate essentially linear heat and pressure fabricatable high temperature resin and compacting the resultant mixture in a grinding wheel mold at an elevated temperature of about 250° to 500° C. and pressure of from about 10,000 to 50,000 p.s.i., so as to form said wheel, the improvement comprising incorporating in said mixture, prior to said compacting, a particulate water-insoluble lead glass having a viscosity of less than $10^{11}$ poises at resin fabrication temperatures of about 250° to 500° C. which flows under said compacting at from about 10,000 to 50,000 p.s.i. at said elevated temperatures of about 250° to 500° C. so that about 5% to about 31% of the nonabrasive volume is composed of said glass.

6. The process of claim 5 in which the high temperature resin is a coalesceable aromatic polyimide.

7. The process of claim 5 in which a particulate metal is also incorporated in said mixture prior to compaction.

8. The process of claim 6 in which the aromatic polyimide is poly - N,N' - (4,4' - oxydiphenylene) pyromellitimide.

9. The process of claim 7 in which the particulate metal comprises 0% to about 20% of the non-abrasive volume.

10. The process of claim 9 in which the high temperature resin is poly - N,N' - (4,4' - oxydiphenylene) pyromellitimide.

References Cited

UNITED STATES PATENTS

| 3,249,588 | 5/1966 | Gall | 51—298 |
| 3,295,940 | 1/1967 | Gerow | 51—298 |
| 3,349,061 | 10/1967 | Pruckmayr | 51—298 |
| 3,385,684 | 5/1968 | Voter | 51—298 |

DONALD J. ARNOLD, Primary Examiner

U.S. Cl. X.R.

51—308, 309

PO-1050
(5/69)

UNITED STATES PATENT OFFICE
CERTIFICATE OF CORRECTION

Patent No. 3,523,773     Dated August 11, 1970

Inventor(s) Leo A. Sears

It is certified that error appears in the above-identified patent and that said Letters Patent are hereby corrected as shown below:

Claim 1, line 3, "fabricable" instead of "fabricatable".

Claim 5, line 3, "fabricable" instead of "fabricatable".

SIGNED AND
SEALED
DEC 15 1970

(SEAL)
Attest:

Edward M. Fletcher, Jr.
Attesting Officer

WILLIAM E. SCHUYLER, JR.
Commissioner of Patents